United States Patent [19]

Bitter et al.

[11] E Patent Number: Re. 33,343

[45] Reissued Date of Patent: Sep. 18, 1990

[54] CRACK DETECTOR FOR ELECTRICALLY CONDUCTIVE WINDSHIELD

[75] Inventors: Lowell E. Bitter, Holland; Bryan L. Lundgren, South Haven, both of Mich.

[73] Assignee: Donnelly Corporation, Holland, Mich.

[21] Appl. No.: 141,918

[22] Filed: Jan. 11, 1988

Related U.S. Patent Documents

Reissue of:

[64] Patent No.: 4,565,919
Issued: Jan. 21, 1986
Appl. No.: 620,687
Filed: Jun. 14, 1984

[51] Int. Cl.[5] ..... H05B 1/02; B60L 1/02

[52] U.S. Cl. ..... 219/509; 219/203; 219/522

[58] Field of Search ..... 219/202, 203, 218, 509, 219/511, 522, 541, 543

[56] References Cited

U.S. PATENT DOCUMENTS

| | | | |
|---|---|---|---|
| 2,530,980 | 11/1950 | Mershon | 219/20 |
| 3,441,925 | 4/1969 | White | 340/274 |
| 3,524,920 | 8/1970 | Stromquist et al. | 174/68.5 |
| 3,760,157 | 9/1973 | Newman et al. | 219/509 X |
| 3,790,745 | 2/1974 | Levin | 219/203 |
| 3,876,862 | 4/1975 | Newman et al. | 219/203 X |
| 3,892,947 | 7/1975 | Strengholt | 219/522 |
| 3,905,015 | 9/1975 | Inose et al. | 340/61 |
| 3,941,975 | 3/1976 | Newman et al. | 219/203 X |
| 3,982,092 | 9/1976 | Marriott | 219/203 |
| 4,109,196 | 8/1978 | Carmody | 324/62 |
| 4,127,765 | 11/1978 | Heaney | 219/218 |
| 4,135,078 | 1/1979 | Kuiff et al. | 219/203 |
| 4,260,876 | 4/1981 | Hochheiser | 219/203 X |

OTHER PUBLICATIONS

Brochure entitled, "Stratobel Alarm a.c.c.", by Glaverbel of Brussels, Belgium, 1982.

*Primary Examiner*—B. A. Reynolds
*Assistant Examiner*—M. M. Lateef
*Attorney, Agent, or Firm*—Price, Heneveld, Cooper, DeWitt & Litton

[57] ABSTRACT

A circuit and method for interrupting power applied to an electrically conductive panel such as a vehicle windshield or window upon cracking of the conductive coating or element thereon. The circuit includes structure for (1) monitoring the resistance of the conductive element and (2) interrupting power applied thereto when the resistance of the conductive element assumes a value indicative of element cracking.

18 Claims, 1 Drawing Sheet

CRACK DETECTOR FOR ELECTRICALLY CONDUCTIVE WINDSHIELD

Matter enclosed in heavy brackets [ ] appears in the original patent but forms no part of this reissue specification; matter printed in italics indicates the additions made by reissue.

BACKGROUND OF THE INVENTION

The present invention relates to electrically conductive window glass, and more particularly to a control system for monitoring the condition of the window glass and interrupting power applied thereto in case of glass fracture.

A wide variety of electrically conductive windows have been developed which can be rapidly and effectively defogged and/or deiced. These windows are gaining wide-spread popularity in the automotive field where rapid defogging and deicing is not only a convenience, but a safety feature greatly enhancing the safe operation of the vehicle. For example, one particularly effective electrically conductive windshield is disclosed in U.S. patent application Ser. No. 438,789, filed Nov. 3, 1982, by Bitter, entitled PROCESS FOR MAKING A CONDUCTIVELY COATED GLASS MEMBER AND THE PRODUCT THEREOF, and assigned to the assignee of the present application. This windshield includes a conductive thin film, and more particularly a coating of indium tin oxide, on laminated glass. Electric current is conducted through the coating to resistively heat the glass and thereby defog and deice the windshield.

Typically, electrically conductive windshields draw 5 to 15, and even 30, amps of electric current at 20 to 60 volts during heating, possibly leading to several problems if not carefully controlled. First, if the temperature of the windshield becomes excessive, the windshield could possibly delaminate upon melting of the PVB lamination material. In the Bitter windshield, delamination could occur at approximately 150° to 220° F. Overheating also reduces the ability of the windshield to absorb in an accident the energy of impact of a person hitting the windshield but not penetrating the windshield. Such overheating therefore impairs the intended safety features of a conventional "safety" windshield. At least one prior artisan includes a temperature sensor on the windshield to detect an overtemperature condition and interrupt power applied to the windshield if the temperature becomes excessive. An example of this control is disclosed in U.S. Pat. No. 3,790,745, issued Feb. 5, 1974, to Levin, and entitled TEMPERATURE CONTROL OF ELECTRICALLY HEATABLE WINDOW.

Another possible problem arising from the currents and voltages involved with electrically heated windshields is the potential electric shock to an individual striking the windshield, for example in an accident. If a vehicle occupant strikes and fractures the windshield, it is possible that the occupant will engage the electrical potential and receive injury causing shock. This possibility, though remote, is of concern in commercial deployment of the product.

Yet another possible problem arising from this applied power is the potential of local ignition and flame that might occur if the electrically heated windshield breaks and sustained power continues to be applied to the windshield for a considerable time after the impact.

Highly concentrated and sustained currents could cause ignition of the PVB lamination material. This may be a safety concern.

In an attempt to monitor this glass breakage, prior artisans have developed frangible bus bars secured to the glass. Examples are illustrated in U.S. Pat. No. 3,892,947, issued July 1, 1975, to Strengholt, entitled ELECTRICALLY HEATED PANEL WITH ANTI-SHOCK CONDUCTIVE STRIPS; and U.S. Pat. No. 3,524,920, issued Aug. 18, 1970, to Stromquist et al, entitled CIRCUIT BREAKER FOR CONDUCTIVE-COATED GLASS. Although these structures will adequately detect breakage when the bus bar is fractured, these structures do not detect relatively small centrally located window fractures or cracks, as might occur in striking a windshield. Further, these devices are not capable of detecting cracks in the conductive coating where the glass itself is not broken to the edge.

A security system sold under the mark STRATOBEL by Glaverbel of Brussels, Belgium, detects breakage of an electrically conductive window glass by monitoring the resistance of the electrically conductive window element. So long as the glass is unbroken, the resistance of the element remains constant. However, when the panel is broken, the resistance of the element changes to sound an alarm. However, it is believed that this system does not disrupt the flow of current to the glass.

SUMMARY OF THE INVENTION

The aforementioned problems are overcome in the present invention. Essentially, a control circuit for an electrically conductive panel is provided which continually monitors for cracking of the conductive element by monitoring electric resistance and interrupts power applied to the element when cracking of the element is detected. Structurally, the control circuit includes a controllable switch coupled in series with the power line of the conductive panel, windshield, or window, and a circuit for determining the electrical resistance of the conductive element. So long as the element remains uncracked, the resistance of the element remains relatively constant, and the controllable switch remains closed. When the resistive element cracks, the resistance of the element changes substantially, and the controllable switch is opened to prevent further power from being applied to the element. Preferably, the resistance is determined using Ohm's law by dividing the voltage across the element by the current passing through the element.

The control circuit of the present invention is a simple yet efficient and reliable power control for the resistively heated panel such as a window glass. Any time that cracking of the resistive coating is detected, perhaps most importantly when a vehicle occupant strikes and breaks the windshield, the power applied to the conductive coating on the panel is immediately interrupted to essentially eliminate the possibility of potential damage because of electrical power to the glass. Additionally, the device monitors for central breakage of the windshield, for example by stones thrown up from the road, providing protection from the effects of local excessive heating due to fracture.

In a preferred embodiment of the invention, the control circuit further includes a thermostatic element operatively coupled to the heated panel for opening the controllable switch when the panel temperature becomes excessively high. When the panel is a windshield, this reduces the possibility of delamination and reduced impact energy absorption capability. The temperature control further improves the overall safety of the product.

These and other objects, advantages, and features of the invention will be more readily understood and appreciated by reference to the drawings and the detailed description of the preferred embodiment.

DETAILED DESCRIPTION OF THE PREFERRED EMBODIMENT

Figure 2:
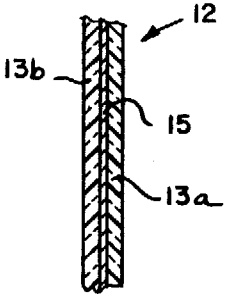
FIG. 2 is a fragmentary sectional view taken along plane II—II in FIG. 1.
Figure 1:
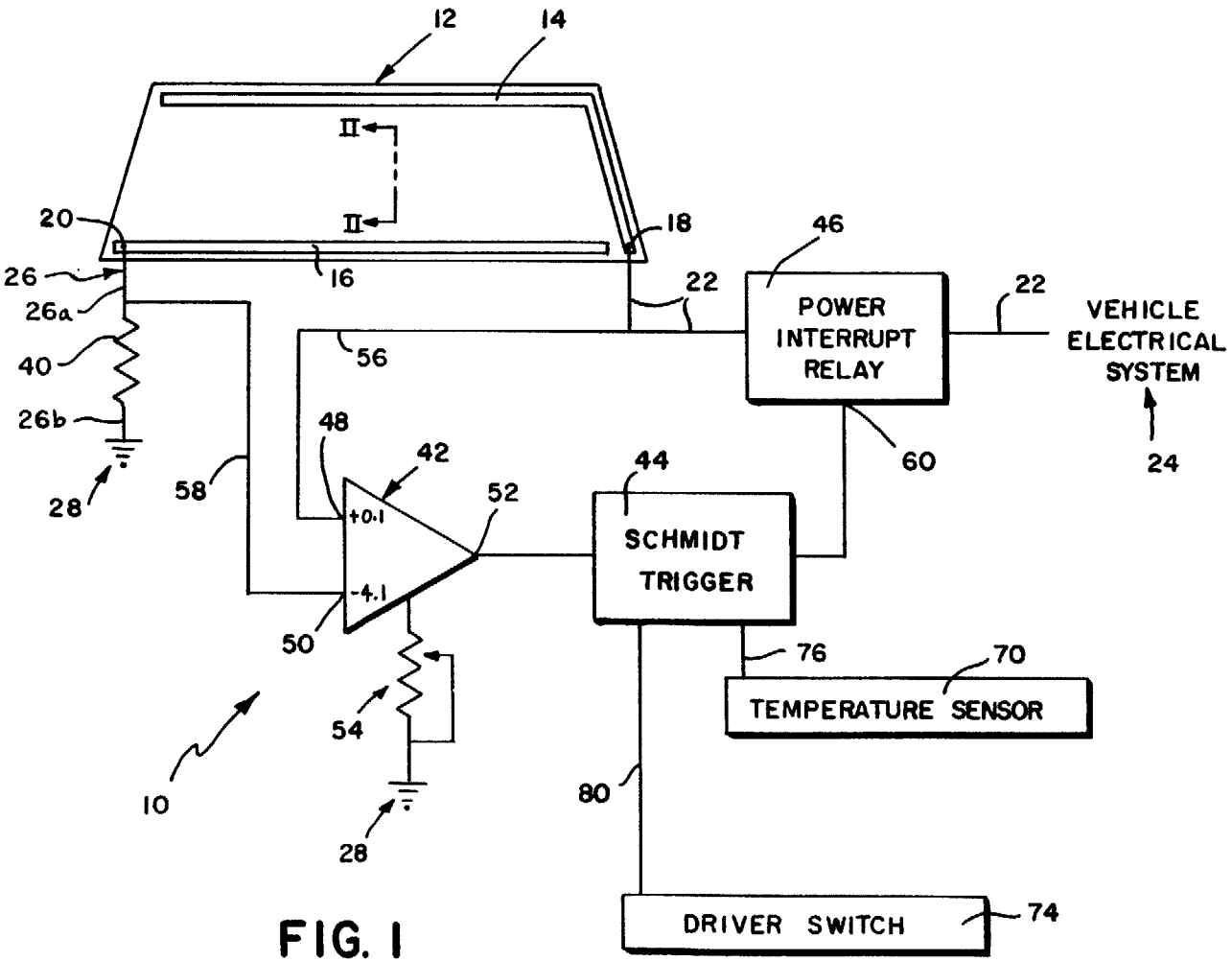
FIG. 1 is a schematic diagram showing the window glass power control circuit of the present invention.

A control circuit for an electrically conductive panel such as a windshield or other window glass is illustrated in FIG. 1 and generally designated 10. The circuit is shown installed on an electrically conductive windshield 12, for example of the type disclosed in the above mentioned application Ser. No. 438,789, filed Nov. 3, 1982, the disclosure of which is hereby incorporated by reference. Windshield 12 includes a pair of glass layers 13a and 13b and a resistive coating 15 deposited therebetween (FIG. 2). Windshield 12 further includes a pair of bus bars 14 and 16 each of which has a terminal 18 and 20, respectively (FIG. 1). Bus bar 14 is arranged to extend substantially along the entire top edge and one side of the windshield, while bus bar 16 extends along the lower edge of the windshield. Both bus bars 14 and 16 are electrically coupled to electrically conductive coating 15 of the windshield 12. The windshield is therefore selectively heated by selectively applying power across terminals 18 and 20 so that current flows through the conductive coating. The coating is resistive causing heat buildup, which is conductively transferred to the adjacent windshield glasses 13a and 13b. In the preferred embodiment, the resistance of the coating between terminals 18 and 20 is approximately 4 ohms.

Power cable 22 extends between vehicle electric system 24 and terminal 18. Power cable 26 extends between terminal 20 and vehicle ground 28. Consequently current may be conducted through cables 22 and 26 to convey current from the vehicle electrical system through electrically conductive coating 15 adhered or bonded to windshield 12. In the preferred embodiment, the voltage applied to cable 22 from electrical system 24 varies between 20 and 60 volts primarily depending upon the speed of the vehicle alternator. In view of the fact that the resistance of the conductive coating on the windshield is 4 ohms, the windshield coating conducts approximately 5 to 15 amps during heating.

Crack detecting circuit 10 includes ground resistor 40, voltage comparator 42, Schmidt trigger 44, and controllable switch or power interrupt relay 46. Ground resistor 40 is coupled in series in cable 26 between terminal 20 and ground 28. In the preferred embodiment, ground resistor 40 has a resistance of approximately 0.1 ohm and is a wire with specific resistance.

Voltage summing amp 42 is generally well-known to those having ordinary skill in the art and includes input terminals 48 and 50 and output terminal 52. Summing and 42 adds +0.1 times the voltage at terminal 48 to −4.1 times the voltage at terminal 50 and outputs the result on terminal 52. Summing amp 42 further includes a balancing potentiometer or "pot" 54 enabling the amp to be balanced to zero after control circuit 10 is installed on windshield 12. Line 56 electrically interconnects terminals 18 and 48. Similarly, line 58 electrically interconnects terminals 20 and 50.

Power interrupt relay 46 in the preferred embodiment is a mechanical solenoid. Alternatively, relay 46 could be a solid-state device or any other controllable switch. Relay 46 is coupled in series in cable 22 and includes a control terminal 60. Switch 46 is closed when current is applied to the control terminal and opened when current is not applied to the control terminal.

Schmidt trigger 44 is electrically coupled in series between terminal 52 of amp 42 and control terminal 60 of relay 46. Although trigger 44 in the preferred embodiment is a Schmidt trigger, any switching or control circuit with hysteresis could be used. Preferably, trigger 44 ignores starting transients for a period of approximately 0.1 seconds or less after power is applied to windshield 12.

Control circuit 10 further includes temperature sensor 70 and driver actuated switch 74, both of which are conventional elements. Temperature sensor 70 in the preferred embodiment is a thermister, such as any one of those sold by DuPont, laminated between glasses 13a and 13b. Alternatively, sensor 70 could be a surface mounted thermostat, such as any one of those sold by Elmwood Sensors, Inc., of Cranston, Rhode Island. Sensor 70 is preferably selected to actuate at approximately 150° F. to prevent delamination and to prevent significantly reduced shock absorption capabilities of windshield 12. Driver switch 74 is coupled to trigger 44 through line 80 and is preferably mounted in a position readily accessible to the vehicle driver so that the switch can be easily actuated when windshield heating is desired. Sensor 70 and switch 74 are both operatively connected to trigger 44 in conventional fashion so that the trigger is responsive to the sensor and switch.

ASSEMBLY AND OPERATION

Preferably, control circuit 10 and windshield 12 are installed in the vehicle as OEM equipment. Alternatively, circuit 10 and windshield 12 can be installed in a vehicle to replace an existing nonconductive windshield. Control circuit 10 is coupled to the vehicle electrical system and windshield 12 as illustrated in FIG. 1. The only adjustment which is required after assembly is the setting of balance pot 54 on summing amp 42 to insure that the voltage output of amp 42 at terminal 52 is essentially zero when the conductive coating on windshield 12 is uncracked (e.g., at initial installation).

So long as the conductive coating remains uncracked, the resistance of the windshield is relatively constant and in the preferred embodiment approximately 4 ohms. Although the conductive coating can be cracked by a number of objects and/or conditions, the windshield is most typically cracked either by airborne objects, such as stones, or people striking the windshield. Any cracking of the electrically conductive coating causes the coating resistance to rise and consequently the current conducted therethrough under constant voltage to fall. The condition of the conductive coating can therefore be monitored by monitoring the resistance of the coating. In control circuit 10, the resistance of the coating is monitored utilizing Ohm's law ($R=V/I$), whereby the voltage applied to the windshield coating is compared with the current flowing through the windshield coating. The controllable switch is opened whenever this proportion assumes an unacceptable value indicating that the resistance has significantly changed from the initial uncracked condition.

Ohm's law is implemented in circuit 10 via ground resistor 40 and summing amp 42. The voltage at terminal 20 is directly proportional to the current flowing through the windshield coating. The voltage at terminal 20 is equal to the resistance of resistor 40 times the current flowing through the resistor, which is for example equal to 0.1 ohm×(V/4.1), which is equal to V/41, where V is the voltage at terminal 18. Consequently, the voltage outputted by summing amp 42 on terminal 52 is equal to 0.1 V (contribution at terminal 48) minus 4.1 V/41 (contribution at terminal 50), which is essentially equal to zero so long as the resistance of the windshield coating remains relatively constant (i.e., 4 ohms). However, when the resistance rises (i.e., when the conductive coating is cracked), the output of summing amp 42 assumes an essentially nonzero value and Schmidt trigger 44 terminates power to control terminal 60 of relay 46 such that the power circuit is opened or interrupted. For example, variances of one to ten percent in the calculated resistance of the coating may be acceptable, while larger variances would be unacceptable and indicative of fracture. In the event that a vehicle occupant has struck and broken the windshield, such interruption essentially eliminates the possibility that a voltage will be applied to that person.

Preferably, Schmidt trigger 44 is additionally responsive to temperature sensor 70 and driver switch 74. More particularly, trigger 44 will open relay 60 if (1) the input from summing amp 42 is essentially nonzero, (2) the driver switch 74 is open or "off", or (3) the windshield temperature is excessive (e.g., greater than 150° F.). Stated another way, trigger 44 will close relay 46 only if (1) summing amp 42 output essentially zero, (2) the driver switch 74 is closed or "on", and (3) the windshield temperature as sensed by sensor 70 is below 150° F.

The temperature control circuit of the present invention is a simple yet highly efficient and effective means of enhancing the safety of an electrically conductive panel such as a windshield or other glass panel. The circuit continually monitors the condition of the electrically conductive coating by monitoring the resistance of the coating and immediately interrupts power applied to the panel coating or windshield coating if the resistance assumes an undesired value.

The above description is that of a preferred embodiment of the invention. Various changes and alternations can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. An electrically heated panel assembly comprising:

a panel including an electrically conductive coating;

cable means for conducting direct current through said coating;

controllable switch means coupled in series with said cable means for opening and closing a circuit through said cable means, said controllable switch means including a control terminal;

a ground resistor coupled in series with said cable means between said conductive coating and ground;

comparator means for comparing the voltage across said coating and the voltage across said ground resistor; and control means coupled to said control terminal and responsive to said comparator means for opening said controllable switch means when the relation of the coating voltage to the ground resistor voltage is unacceptable.

2. A panel assembly as defined in claim 1 further comprising means for sensing the temperature of said panel, and wherein said control means is further responsive to said temperature sensing means and includes means for opening said controllable switch when the temperature of said panel exceeds a preselected value.

3. A panel assembly as defined in claim 1 wherein said comparator means comprises a summing amplifier including a balance pot.

4. A panel assembly as defined in claim 1 wherein said panel is a window panel.

5. An improved electrically conductive panel assembly including a panel having an electrically conductive element, circuit means for conducting direct current through the element, and switch means for opening and closing said circuit means, wherein the improvement comprises said switch means comprising:

a controllable switch coupled in series with said circuit means, said controllable switch including a control terminal;

current measuring means for measuring the current passing through the element when said controllable switch is closed;

voltage measuring means for measuring the voltage applied across the element;

calculator means responsive to said current measuring means and said voltage measuring means for producing an output indicative of the resistance of the element; and control means responsive to said calculator means and coupled to said control terminal for opening said controllable switch when the resistance of the element is unacceptable.

6. An improved panel assembly as defined in claim 5 wherein said current measuring means comprises a ground resistor coupled in series with the circuit means, said ground resistor having a fixed known resistance, whereby the voltage across said ground resistor is directly proportional to the current through the resistor and element.

7. An improved panel assembly as defined in claim 6 wherein said calculator means comprises a summing amp having inputs connected across the electrically conductive element and across said ground resistor.

8. An improved panel assembly as defined in claim 7 wherein said summing amp includes a balance pot enabling said summing amp to be factory balanced.

9. An improved panel assembly as defined in claim 5 further comprising temperature sensing means for sensing the temperature of the panel, and wherein said control means is further responsive to said temperature sensing means and includes means for opening said controllable switch when the panel temperature exceeds a preselected temperature.

10. An improved panel assembly as defined in claim 5 wherein said panel is a window panel.

11. A method of interrupting electrical D.C. power to a resistively heated panel upon cracking of the conductive element therein, said method comprising the steps of:

monitoring the resistance of the conductive element by monitoring the voltage applied to the conductive element and the current passing through the conductive element and calculating the resistance using Ohm's law; and interrupting power to the conductive element when the resistance of the element assumes an undesired value.

12. A method as defined in claim 11 further comprising monitoring the temperature of the panel, and wherein said interrupting step includes interrupting the power when the panel temperature assumes an undesired value.

*13. An improved electrically conductive panel assembly including a panel having an electrically conductive element, circuit means for conducting direct current through the element, and switch means for controlling the current passing through said circuit means, wherein the improvement comprises said switch means comprising:*

*a controllable switch coupled in series with said circuit means, said controllable switch being actuable between first and second states and including a control terminal;*

*current signal means for providing a signal indicative of the current passing through the element;*

*voltage signal means for providing a signal indicative of the voltage across the element;*

*calculator means responsive to said current signal means and said voltage signal means for producing an output indicative of the resistance of the element; and*

*control means responsive to said calculator means and coupled to said control terminal for actuating said controllable switch from one of the states to the other of the states when the resistance of the element is unacceptable.*

*14. An improved panel assembly as defined in claim 13 wherein said current signal means comprises a ground resistor coupled in series with the circuit means, said ground resistor having a fixed known resistance, whereby the voltage across said ground resistor is directly proportional to the current through the resistor and element.*

*15. An improved panel assembly as defined in claim 14 wherein said calculator means comprises a summing amp having inputs connected across the electrically conductive element and across said ground resistor.*

*16. An improved panel assembly as defined in claim 15 wherein said summing amp includes a balance pot enabling said summing amp to be factory balanced.*

*17. An improved panel assembly as defined in claim 13 further comprising temperature signal means for providing a signal indicative of the temperature of the panel, and wherein said control means is further responsive to said temperature signal means and includes means for actuating said controllable switch when the panel temperature exceeds a preselected temperature.*

*18. An improved panel assembly as defined in claim 13 wherein said panel is a window panel.*

* * * * *

UNITED STATES PATENT AND TRADEMARK OFFICE

CERTIFICATE OF CORRECTION

PATENT NO. : RE 33,343

DATED : Sept. 18, 1990

INVENTOR(S) : Lowell E. Bitter & Bryan L. Lundgren

It is certified that error appears in the above-identified patent and that said Letters Patent is hereby corrected as shown below:

Column 3, Line 67
"and" should be --amp--;
Column 5, Line 52
"alternations" should be --alterations--.

Signed and Sealed this

Fourth Day of August, 1992

*Attest:*

DOUGLAS B. COMER

*Attesting Officer*

*Acting Commissioner of Patents and Trademarks*